July 3, 1923.

H. F. BICKEL 1,460,364

TRAIN PIPE CONNECTOR

Filed Feb. 2, 1921

Inventor

Henry F. Bickel,

By Dodge and Sons

Attorneys

July 3, 1923.
H. F. BICKEL
TRAIN PIPE CONNECTOR
Filed Feb. 2, 1921
1,460,364
2 Sheets-Sheet 2
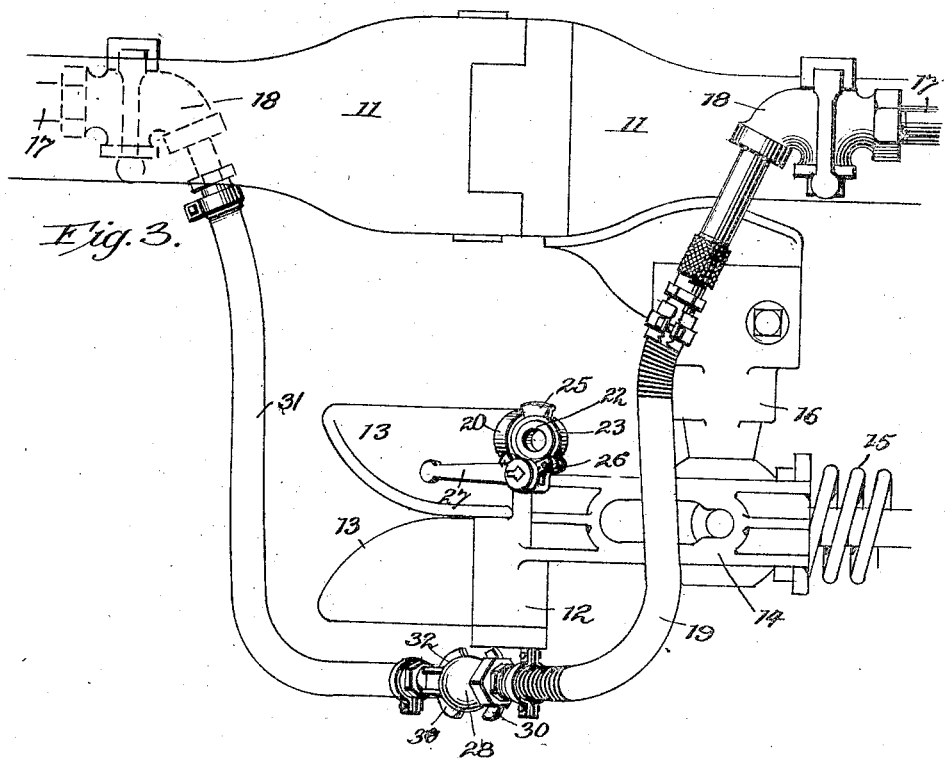
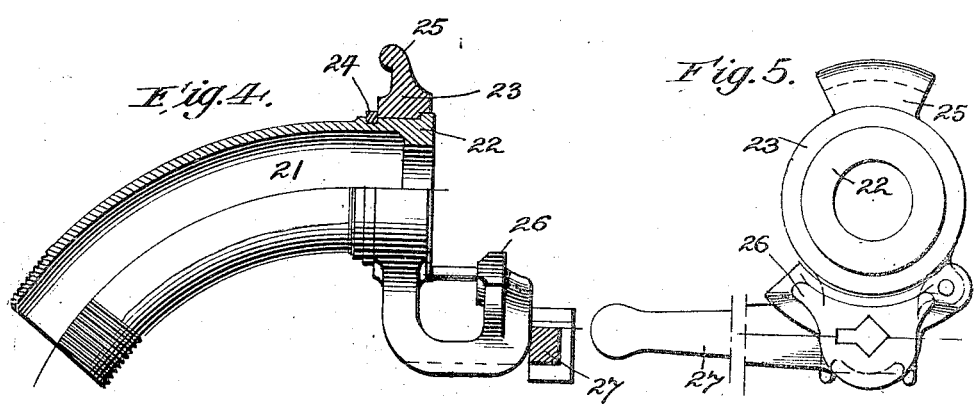
Inventor
Henry F. Bickel
By Dodge and Sons
Attorneys Patented July 3, 1923.

1,460,364

UNITED STATES PATENT OFFICE.

HENRY F. BICKEL, OF PLAINFIELD, NEW JERSEY, ASSIGNOR TO THE NEW YORK AIR BRAKE COMPANY, A CORPORATION OF NEW YORK.

TRAIN-PIPE CONNECTOR.

Application filed February 2, 1921. Serial No. 441,861.

*To all whom it may concern:*

Be it known that I, HENRY F. BICKEL, a citizen of the United States, residing at Plainfield, in the county of Union and State of New Jersey, have invented certain new and useful Improvements in Train-Pipe Connectors, of which the following is a specification.

This invention relates to train pipe connectors, and particularly to a device applicable to automatic connector heads for train pipes to enable the train pipe or pipes of cars equipped with automatic connector heads to be readily connected with corresponding train pipe or pipes of cars not so equipped. The invention is useful in any case where cars equipped with automatic train pipe connector heads, and cars lacking automatic connector heads, but equipped with ordinary train pipe hose and manually operable train pipe hose couplings, are likely to be included in a single train.

The invention is primarily intended to serve as a temporary installation on cars equipped with automatic connector heads, during the period of installation on such connector heads on old rolling stock. It is however capable of continued use as a part of the standard equipment.

Automatic connector heads are ordinarily connected to the train pipes of the corresponding car by means of flexible hose in order to permit the connector heads to move relatively to the car. These hose are usually permanently connected to the connector head and whenever it has been necessary to couple a car equipped with an automatic connector head to a car equipped with the ordinary train pipe hose and train pipe hose couplings, recourse has been had to an adapter. This is clamped to the end of the connector head and is provided with couplings to couple with the train pipe hose couplings of the adjacent car. This involves an extra piece of equipment not permanently attached to either car and likely to be missing when needed.

It has also been proposed to provide a releasable connection between the automatic connector head and a flexible hose connected to the train pipe and to use as the releasable connection ordinary train pipe couplings. This arrangement has the advantage of permitting the connection of the hose to a similar hose on an adjacent car independently of the automatic connector head, and provides for cases where either automatic connector head is out of order as well as for the case where one car is not equipped with an automatic connector head.

If the train pipe coupling attached to the connector head is rigidly mounted thereon, it is difficult to make and break the connection unless an unduly long hose is used, and it is difficult to cause the hose to hang in a free loop, a condition which is essential to durability. If the train pipe coupling carried by the connector head is mounted on a short length of flexible hose, as has been proposed (see reissue patent to Robinson, 13,138, July 26, 1910), the expense of installation and maintenance is unduly increased and the results are not materially better.

To secure a simple construction in which a relatively short length of flexible hose may hang in a perfectly free loop, and in which coupling and uncoupling of the hose to the connector head are simple operations, I so design the connector-head-carried part of the releasable coupling that its locking element is rotatable. This permits the hose to hang in a natural loop, facilitates connection, and permits the use of a shorter hose than could be used if it were necessary to rotate the hose-carried coupler element in the acts of connection and disconnection. The special coupling has also the additional advantage that it includes no gasket but is capable of sealing against the gasket of a standard train pipe coupling presented thereto.

So long as the equipment of the railroad remains mixed these releasable couplings are retained, but so soon as automatic connector heads are completely installed the releasable couplings may be, and ordinarily would be, gradually removed, permanent connection between the flexible hose and the connector head being substituted therefor.

The invention is applicable to almost any type of automatic connector head and to any of various types of train pipe hose coupling. I have chosen, for illustration, however, a type of connector head described and claimed in the application of Minnier and Bickel, Serial No. 361,494, filed Feb. 26, 1920. Accordingly no claims to the connector head per se, are made in the present application.

I have omitted from the drawings all but one train pipe and its connected flexible hose. I recognize, however, that automatic connector heads usually connect a plurality of train pipes and the particular connector head illustrated is of a type designed to connect a plurality of train pipes. I deem it unnecessary and confusing to indicate the duplicate pipes, hose and couplings incident to the multiple pipe installation since this would involve mere duplication of the parts essential to my invention.

In the drawings Fig. 1 is a fragmentary side elevation of the draft and connector gear of two cars, showing my invention applied to two automatic connector heads which are in connecting engagement with each other.

Fig. 3 is a view similar to Fig. 1 showing how a car equipped with an automatic coupler head, and fitted with my present invention is connected with a car equipped with an ordinary train pipe hose and train pipe hose coupling.

Fig. 4 is a side view partly in elevation and partly in section of the special fitting which I mount on the automatic connector head.

Fig. 5 is an end view of the fitting shown in Fig. 4.

Figure 1:
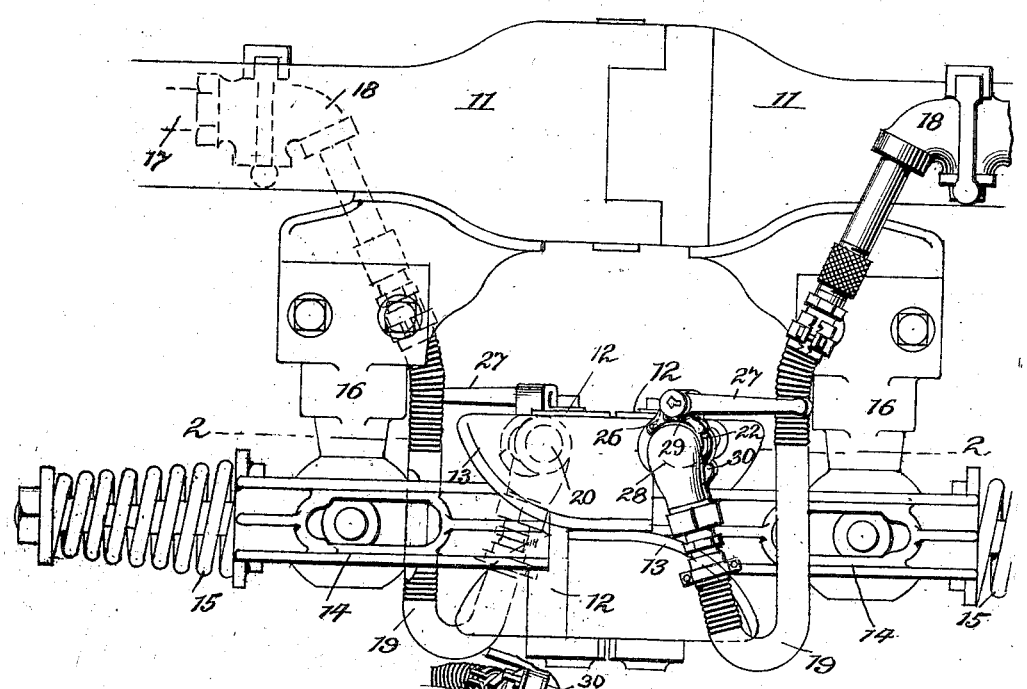

Automatic draw heads or couplers forming parts of the draft rigging of two railway cars are indicated at 11. Automatic connector heads are illustrated at 12. Each of these is provided with offset guiding fingers 13 and is mounted by means of its yoke 14 and thrust spring 15 on a corresponding supporting bracket 16. Each supporting bracket 16 is mounted on the corresponding coupler head 11 so that the connector head 12 is below the coupler head 11 and is capable of limited relative lateral and vertical swinging movements, and of longitudinal sliding movements which are opposed by the spring 15. The face of each connector head 12 between the fingers 13 is formed with orifices which under the guiding and alining action of the fingers 13 will register with corresponding orifices in the opposed head 12 when the cars are coupled together. Gaskets surrounding these orifices serve, under the pressure exerted by the springs 15 of the two heads 12, to seal the joints between the heads 12.

Connector heads of the general type above described are known to those skilled in the art and it is deemed unnecessary to describe their construction and action in detail.

The train pipes are shown at 17 and are provided with the usual angle cocks 18. The angle cock 18 in cars equipped with automatic connector heads is connected in any suitable manner to the flexible hose 19 whose function is to connect the angle cock with a ported boss 20 in the coupler head. The port of boss 20 leads to a corresponding one of the connecting orifices in the face of the head. The present practice is to connect the hose 19 permanently to the port of boss 20 in the side of the connector head 12.

Figure 2:
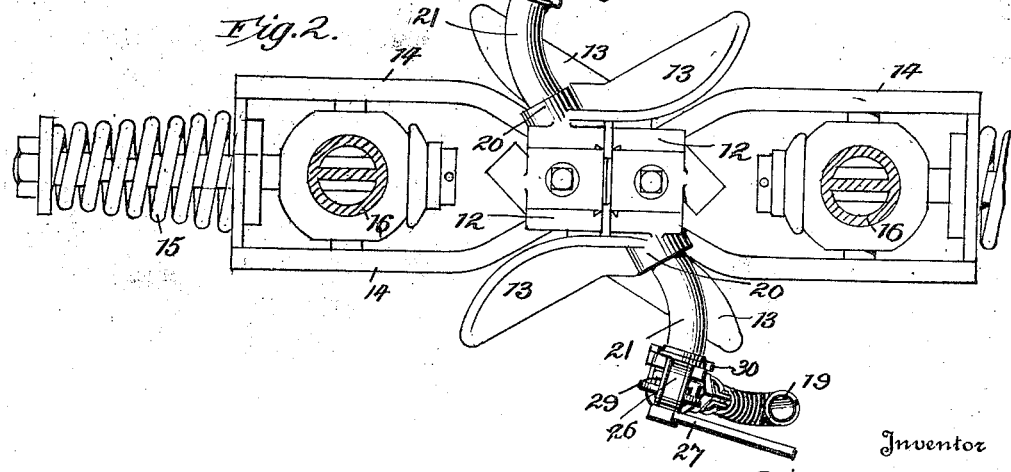
Fig. 2 is in part a section on the line 2—2 of Fig. 1 and in part a plan view of the connector parts.

Instead of making such a permanent connection I provide a curved tubular body or fitting 21 which is screwed into boss 20, (see Fig. 2). The fitting 21 terminates at its outer end in a flange 22 behind which is swiveled a ring 23 held by a retaining ring 24 (see Fig. 4). The ring 23 has a sector flange 25 which is inclined or beveled and at its opposite side the ring has an overhanging lug 26. The ring 23 may be turned about the fitting 21 by means of a handle 27 rigidly connected thereto.

The flexible hose 19 is provided at the end remote from angle cock 18 with a train pipe coupling 28 of any ordinary form. It includes a sector beveled flange 29 and an overhanging lug 30 (see Fig. 1) to connect the coupler 28 to the fitting 21.

To make the connection, handle 27 is thrown to the position shown in Fig. 3. The coupling 28 is then presented to the open end of the fitting 21 so that the gasket which forms a part of such standard couplings seats against the flange 22. The handle 27 is then turned in a clockwise direction (with reference to Figs. 1 and 3), which causes the flange 25 and lug 26 of the ring 23 to engage the lug 30 and flange 29 of the train pipe coupling 28 and then draw the coupling into sealing engagement with the flange 22 of fitting 21. The coupling 28 may be released by turning the handle 27 in reverse direction.

It will be observed that the coupling 28 is not moved during this operation and may assume its own angular position so that hose 19 may be made relatively short and yet may hang in a smoothly curved loop. This is important from an operating standpoint.

The ordinary arrangement of the device is with the coupling 28 connected to the fitting 21. This is shown in Figs. 1 and 2. When a car so equipped is coupled with a car having an ordinary train pipe hose 31 (instead of an automatic connector head) the coupling 28 is released from the fitting 21 and is connected directly to train pipe hose coupling 32 which is a duplicate thereof and which is the standard fitting for use on train pipe hose. This arrangement is shown in Fig. 3. This coupling operation is performed in the usual manner i. e., by placing the apertured faces of the couplings together and then swinging them relatively to each other to interengage their lugs and flanges. They may be uncoupled manually by a reverse manipulation, and will separate automatically if the train parts.

As has been stated connector head 12 is capable of making connections for each of a plurality of train pipes and it is to be understood that the fitting 21 and train pipe coupling 28 would be duplicated for each additional train pipe 17 and hose 19. It is obvious also that in case of disablement of an automatic connector head 12 the couplings 28 might be directly connected with each other thus establishing a connection between the train pipes 17 of adjacent cars entirely independently of the automatic connector heads.

The invention is applicable to any number of train pipes and to various different types of automatic heads and train pipe couplings. It does not involve the use of any detached accessory parts and offers means to revert temporarily to the old method of train pipe coupling in case difficulty is encountered with the automatic connector heads. From that point of view it is useful in the specific form shown, or a minor modification thereof, as a permanent part of automatic connector head installations.

In the claims I shall use the term "train pipe hose coupling" to define generically any one of the various well known couplings used in railway practice to connect train pipe hose. Such couplings are characterized by three familiar features. (1) The couplings are duplicates of each other. (2) They are manually connected. (3) Two of them when connected together will disconnect automatically if the train parts. The use of the term implies the presence of these well known functions.

What is claimed is:—

1. The combination of a train-pipe; a hose connected thereto at one of its ends; a train-pipe hose coupling connected to the other end of said hose; an automatic connector head; and swiveled clamping means on said head for releasably connecting said train pipe hose coupling thereto to establish communication between said head and pipe.

2. The combination of an automatic connector head; a train pipe; a hose connected to said train pipe; a swiveling connector fitting on said head; and a hose coupling on said hose adapted to connect alternatively with said swiveling connector fitting or with a train pipe hose coupling of another car.

3. The combination with an automatic connector head of a connecting device, mounted on said head, and comprising a body having an apertured sealing face and a locking member swiveled on said body, and operable to engage and hold a train-pipe hose coupling in sealing relation with said face.

4. The combination with an automatic connector head of a connecting device, mounted on said head, and comprising a body having an apertured sealing face and a locking member movably mounted on said body, and operable to engage and hold a train pipe hose coupling in sealing relation with said face and in various angular positions relatively thereto.

In testimony whereof I have signed my name to this specification.

HENRY F. BICKEL.